United States Patent Office 2,923,363
Patented Feb. 2, 1960

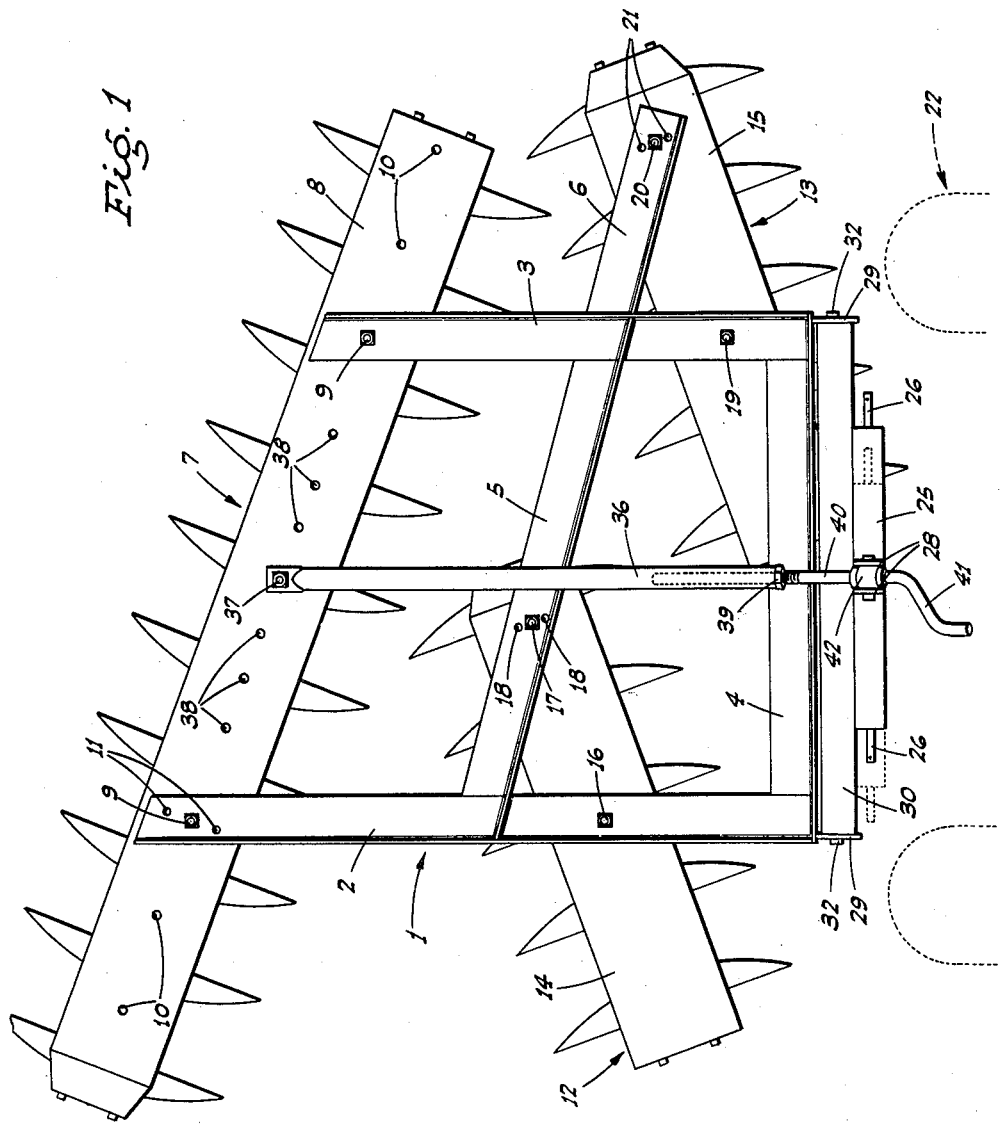

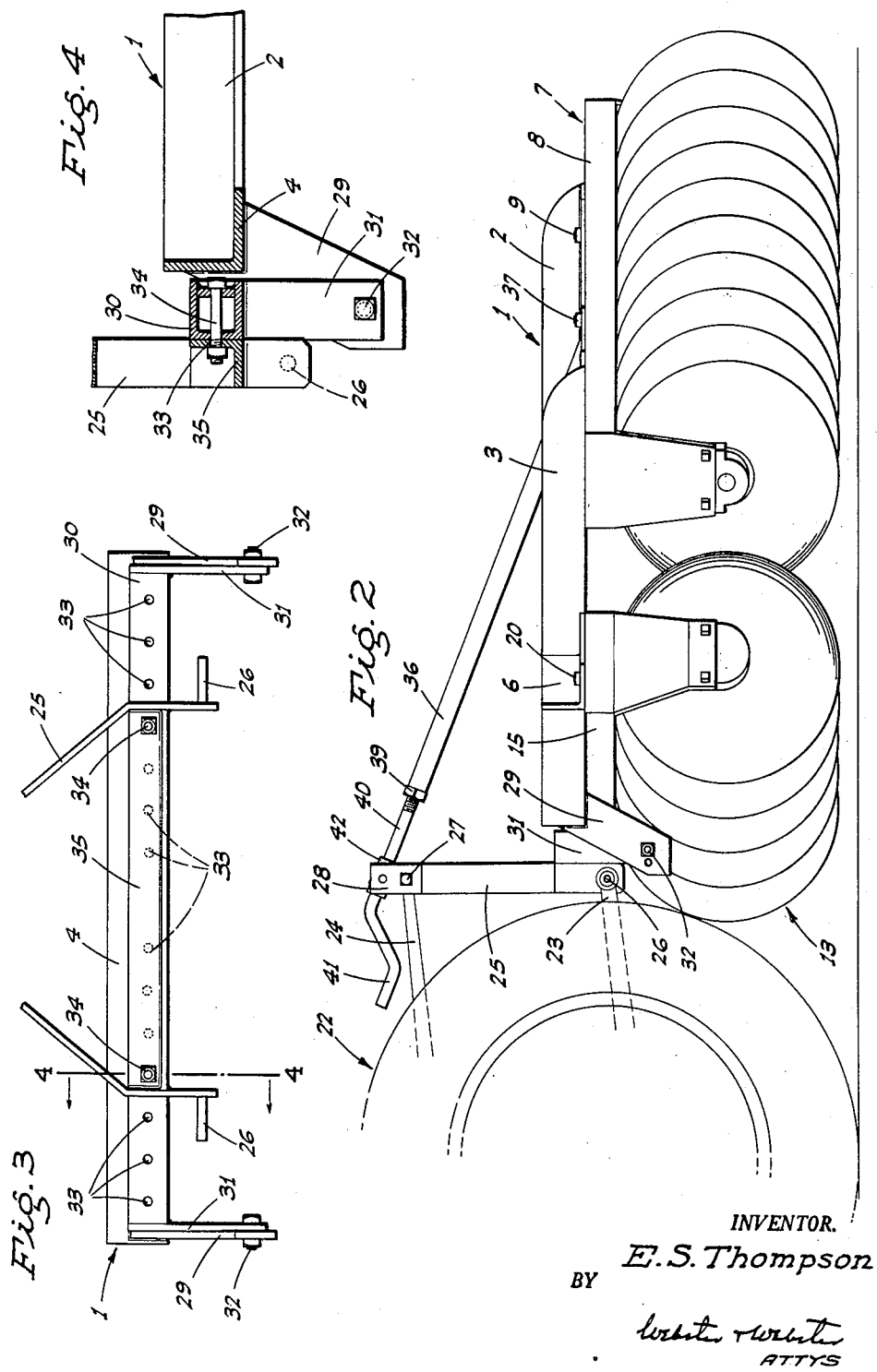

2,923,363
DISC HARROW

Ernest S. Thompson, Strathmore, Calif., assignor to said Ernest S. Thompson and Ethel Thompson, as joint tenants Application November 19, 1956, Serial No. 623,021

2 Claims. (Cl. 172—441)

This invention relates in general to an improved disc harrow.

In particular the invention is directed to, and it is a major object to provide—in a disc harrow of pick-up type adapted for connection to a power-lift hitch at the rear of a tractor—a novel arrangement of the disc gangs which materially reduces or foreshortens the front to rear dimension of the implement; i.e., disposes the rear disc gang closer to the tractor than would otherwise be possible. Such relative short coupling of the harrow, in the direction of travel, not only makes it easier to steer the tractor, but imposes lesser load of the lift-type hitch when the harrow is lifted for the purpose of making a turn in the field, or transport from point to point.

Thus, one of the primary advantages of the present disc harrow is that it can be manufactured in a relatively large size without imposing too great a lift burden on the tractor to which the implement is hitched.

Another important object of the invention is to provide a disc harrow, as in the preceding paragraph, in which such relatively foreshortening of the implement is made possible by employing—ahead of the rear, forwardly diagonal rear disc gang—a front gang assembly comprised of a pair of relatively short, rearwardly diagonal front disc gangs which are staggered transversely of the implement and spaced apart in parallelism lengthwise thereof, with adjacent end portions in lapping relation.

An additional object of the invention is to provide a disc harrow which includes a novel hitch mount at the front thereof, and which mount spans or bridges a forward end portion of one of the front disc gangs; this also being a feature which permits of the desired foreshortening of the implement.

A further object of the invention is to provide a disc harrow having a hitch mount arranged so that the implement can be readily adjusted to a right or left hand offset position.

It is also an object of the invention to provide a practical, reliable, and durable disc harrow, and one which will be exceedingly effective for the purpose for which it is designed.

These objects are accomplished by means of such structure and relative arrangement of parts as will fully appear by a perusal of the following specification and claims.

In the drawings:

Fig. 1 is a top plan view of the improved disc harrow.

Fig. 2 is a side elevation of the same as attached to a tractor and in lifted or above-ground position.

Fig. 3 is a transverse elevation showing the hitch mount employed at the forward end of the main draft frame.

Fig. 4 is an enlarged fragmentary cross section on line 4—4 of Fig. 3.

Referring now more particularly to the drawings, and to the characters of reference marked thereon, the disc harrow comprises a substantially horizontal main draft frame, indicated generally at 1, which frame is relatively short—front to rear—and includes longitudinal side beams 2 and 3, a front cross beam 4, and an intermediate cross beam 5; the latter having a free end projection beyond the side beam 3, the projecting end portion of said intermediate cross beam 5 being indicated at 6.

A relatively long, forwardly diagonal, rear disc gang, indicated generally at 7, is disposed beneath the rear of the main draft frame 1; said rear disc gang 7 including a flat-topped gang frame 8 to which the rear ends of the side beams 2 and 3 are connected in face to face engagement by means of bolts 9. The gang frame 8 is formed—in the length thereof—with a number of bolt holes 10 whereby to permit of adjustment of the rear disc gang 7 transversely of the harrow. Also, the angle or the diagonal of the rear disc gang 7 can be adjusted by moving the bolt 9 corresponding to side beam 2 to a forward or rearward hole 11 therein.

Below the main draft frame 1, and adjacent but forwardly of the rear disc gang 7, the harrow embodies a novel front disc gang assembly comprised of a pair of relatively short, rearwardly diagonal front disc gangs, indicated generally at 12 and 13; said disc gangs 12 and 13 being disposed in staggered relation transversely of the harrow, spaced in substantial parallelism longitudinally of the harrow, and having adjacent end portions disposed in lapping relation.

The relatively short front disc gangs 12 and 13 include flat-topped gang frames 14 and 15, respectively. The frame 14 of disc gang 12 is secured—in face to face relation intermediate its ends—to the side beam 2 by a bolt 16, and—at the inner end—to the intermediate cross beam 5 by another bolt 17. The bolt 17 can be adjusted to or fro, to alter the angle or diagonal of the disc gang 12, by moving said bolt to a forward or rear hole 18 in said intermediate cross beam 5.

The frame 15 of disc gang 13 is similarly attached to the main draft frame 1; such gang frame 15 being secured in face to face relation—intermediate its ends— to the side beam 3 by a bolt 19, and—at the outer end— to the projecting end portion 6 of intermediate cross beam 5 by another bolt 20. By adjusting the bolt 20 to or fro to holes 21 the angle or diagonal of disc gang 13 can be adjusted.

By employing a pair of relatively short front disc gangs disposed in the relationship hereinbefore described, a discing or earth working action comparable to a relatively long disc gang is accomplished, yet within much lesser limits, or space, lengthwise of the direction of travel.

As a consequence, the entire implement can be made relatively short lengthwise, and the implement hitched or coupled to a tractor, indicated generally at 22, much closer than would otherwise be possible; all to the end that the harrow is easier to lift, i.e., does not impose as great a load on the lift-type hitch of such tractor, and which hitch conventionally includes transversely spaced, power-actuated lower links 23, and a central upper link 24. The lower links 23 and upper link 24 project rearwardly from the tractor, and at their rear ends attach to an upstanding, transversely disposed hitch frame 25, here shown as an A-frame.

The transversely spaced lower links 23 are connected to trunnions 26 projecting laterally outwardly from the lower ends of the A-frame 25, while the upper link 24 is pivotally connected, as at 27, between transversely spaced ears 28 at the top or apex of said A-frame.

The hitch frame 25 is secured to the main draft frame 1 of the harrow by the following novel mount:

At the front of said main draft frame 1—i.e. at the forward corners—there are forwardly and downwardly inclined, rigid brackets 29, and a substantially horizontal cross bar 30 spans between said brackets adjacent the top thereof and ahead of the front cross beam 4. Such cross bar 30 is formed at the ends with rigid, depending attachment arms 31, and the related brackets 29 and arms 31 are pivotally connected together at their lower ends by transverse pivot bolts 32. At least one of the transverse pivot bolts 32 has selective fore and aft positions on the related bracket 29.

The cross bar 30 is formed, in the length thereof, with a row of spaced holes 33 adapted for the reception of bolts 34 which secure the bottom cross bar 35 of the hitch frame 25 to said cross bar 30. By means this arrangement the hitch frame 25 can be centered on the cross bar 30 or can be adjusted to right or left, in order to accomplish desired offsetting of the disc harrow. Also, the offsetting can be further enhanced by adjustment of one of the transverse pivot bolts 32 which has selective positions on the related bracket 29.

A tubular suspension rod 36 is connected at its lower and rear end by a bolt 37 to the gang frame 8 of the rear disc gang 7 at a point between the side beams 2 and 3. A row of spaced holes 38 in the gang frame 8 permits the suspension rod 36 to be adjusted to right or left corresponding to similar adjustment of the hitch frame 25 on cross bar 30.

From the gang frame 8 the suspension rod 36 extends lengthwise at a forward and upward incline, being fitted at its upper end with a nut 39 in which the shank 40 of a hand crank 41 is threaded. Between the nut 39 and the hand crank 41 the shank 40 is carried in rotatable but axially immovable relation in a swivel connection 42 mounted between the ears 28 above the pivot bolt 27.

By manipulation of the hand crank 41, which runs the threaded portion of the shank 40 either in or out of the nut 39, the effective length of the tubular suspension rod 36 may be varied, and which sets or adjusts the level of the disc harrow; i.e., controls the running depth of the rear disc gang 7 relative to the running depth of the front disc gangs 12 and 13.

It is to be noted that a forward end portion of the front disc gang 13 extends ahead of the front end of the main draft frame 1, and that such portion of the disc gang 13 is bridged by the hitch mounting structure which includes the cross bar 33 and the depending attachment arms 31 pivoted at their lower ends to the corresponding ends of the brackets 29. Not only does this arrangement provide the necessary clearance for such forwardly extending portion of the disc gang 13, but it also provides relatively low hitch points at the front of the main draft frame 1, and which is desirable in connection with the effective operation of a disc harrow.

From the foregoing description it will be readily seen that there has been produced such as device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. A disc harrow of pick-up type adapted to connect to a power-lift tractor hitch which includes an upstanding hitch frame having a bottom cross bar; the harrow comprising a rigid draft frame, disc gangs beneath and secured to the draft frame, means to attach the bottom cross bar of the hitch frame to the front of the draft frame for relative adjustment of the same laterally and about a transverse pivotal axis selectively and independently, and a longitudinal adjustable suspension rod connected between the top of the hitch frame and a laterally adjustable rearward point on the draft frame.

2. A disc harrow of pick-up type adapted to connect to a power-lift tractor hitch which includes an upstanding hitch frame having a bottom cross bar; the harrow comprising a rigid draft frame, disc gangs beneath and secured to the draft frame, a separate cross bar disposed adjacent but ahead of the draft frame in engagement with and substantially longer than the bottom cross bar of the upstanding hitch frame, means to secure the bottom cross bar of the hitch frame to said separate cross bar in selective positions therealong, means transversely pivotally connecting said separate cross bar to the front of the draft frame, the axis of said pivotal connection being a distance below the horizontal plane of said separate cross bar, and a longitudinally adjustable suspension rod connected between the top of the hitch frame and a rearwardly, transversely adjustable point on the draft frame.

References Cited in the file of this patent

UNITED STATES PATENTS

| | | |
|---|---|---|
| 2,440,550 | Martin | Apr. 27, 1948 |
| 2,577,993 | Baccei et al. | Dec. 11, 1951 |
| 2,583,830 | Goble | Jan. 29, 1952 |
| 2,606,415 | Gerber | Aug. 12, 1952 |
| 2,608,145 | Knapp | Aug. 26, 1952 |
| 2,646,657 | Robertson | July 28, 1953 |
| 2,663,239 | Rapp et al. | Dec. 22, 1953 |
| 2,788,730 | Kirchner | Apr. 16, 1957 |
| 2,841,067 | Magarian | July 1, 1958 |
| 2,858,756 | Magarian | Nov. 4, 1958 |

FOREIGN PATENTS

| | | |
|---|---|---|
| 165,847 | Australia | Nov. 1, 1955 |
| 766,489 | Great Britain | Jan. 23, 1957 |